B. L. BOBROFF.
SIGNALING SYSTEM.
APPLICATION FILED JAN. 5, 1918.
1,392,293. Patented Oct. 4, 1921.
4 SHEETS—SHEET 1.
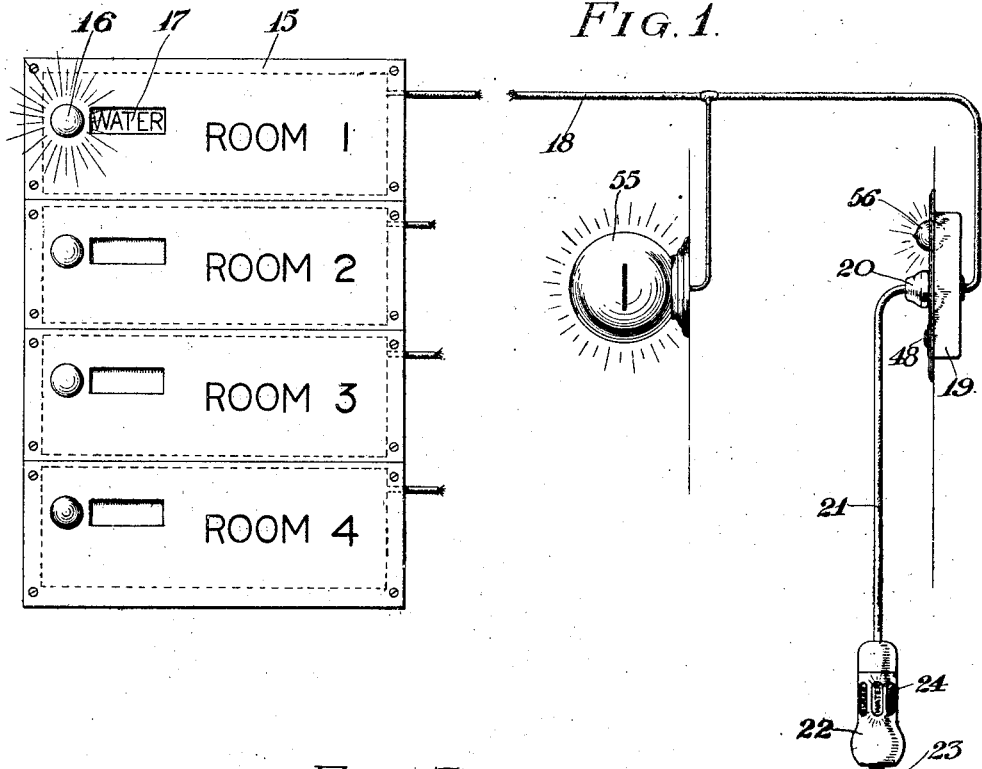
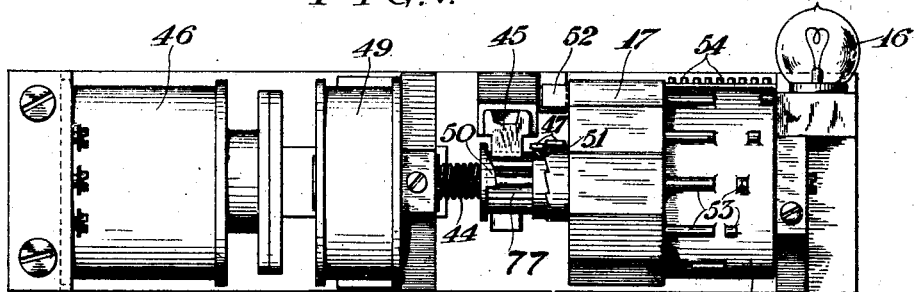
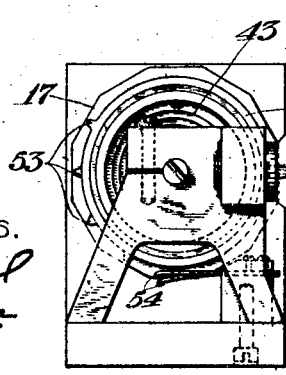
WITNESSES.
INVENTOR.
Barnett L. Bobroff
By R. S. Caldwell
ATTORNEY.

B. L. BOBROFF.
SIGNALING SYSTEM.
APPLICATION FILED JAN. 5, 1918.
1,392,293.
Patented Oct. 4, 1921.
4 SHEETS—SHEET 2.
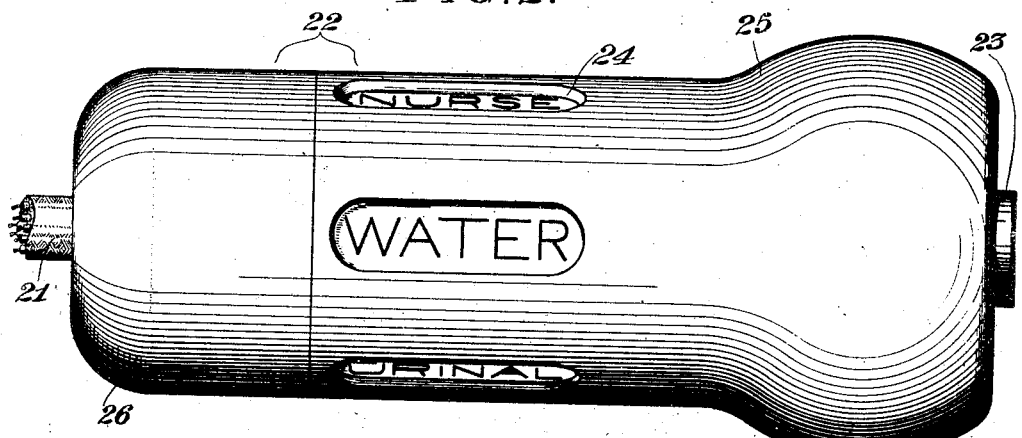
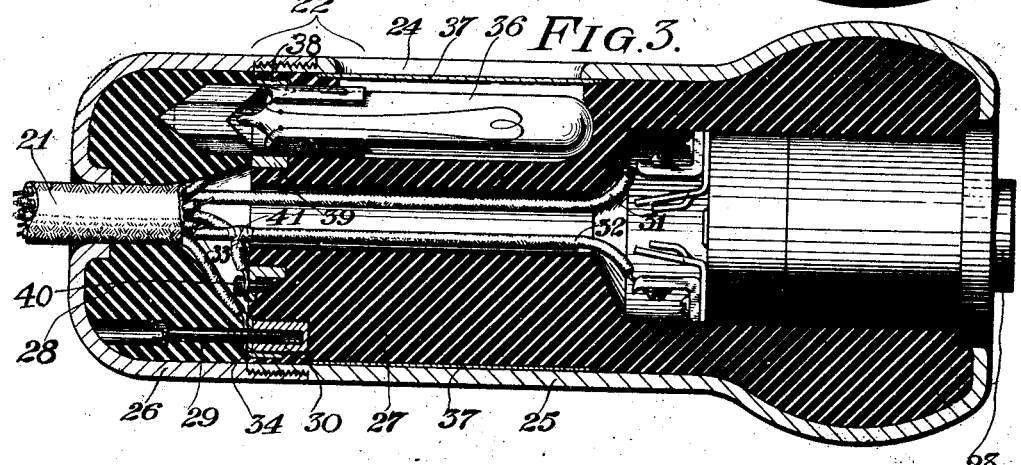
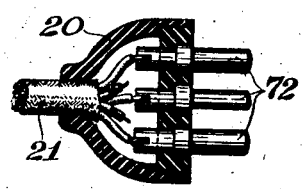
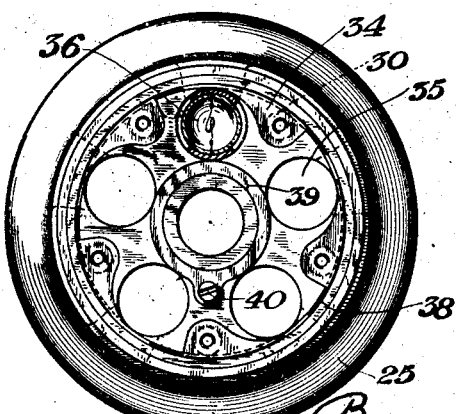
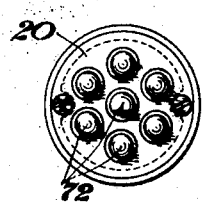

B. L. BOBROFF.
SIGNALING SYSTEM.
APPLICATION FILED JAN. 5, 1918.

1,392,293.

Patented Oct. 4, 1921.
4 SHEETS—SHEET 3.

WITNESSES.

INVENTOR
Barnett L. Bobroff
By R. S. Caldwell
ATTORNEY.

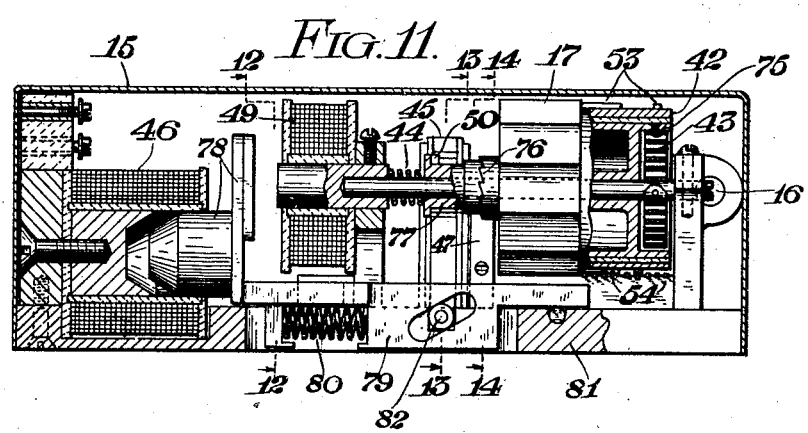

UNITED STATES PATENT OFFICE.

BORNETT L. BOBROFF, OF MILWAUKEE, WISCONSIN.

SIGNALING SYSTEM.

1,392,293.   Specification of Letters Patent.   Patented Oct. 4, 1921.

Application filed January 5, 1918. Serial No. 210,509.

*To all whom it may concern:*

Be it known that I, BORNETT L. BOBROFF, a citizen of the United States, and resident of Milwaukee, in the county of Milwaukee and State of Wisconsin, have invented new and useful Improvements in Signaling Systems, of which the following is a description, reference being had to the accompanying drawings, which are a part of this specification.

This invention has for its object to provide a signaling system particularly adapted for use in hospitals, sanatoriums, and the like, though capable of various other uses, and having as its special feature to permit any patient to transmit a signal to the nurse's station indicating what is desired and showing to the patient by a signal light on the transmitting push button holder the meaning of the signal so transmitted.

Another object of the invention is to provide such a signaling system with a selective annunciator operated step by step by the electrical current impulses caused by the successive operations of the transmitting push button, the annunciator in its various positions controlling the respective lighting circuits including indicating lamps in the push button holder which are suitably marked to convey to the patient the meaning of the signal given.

Another object of the invention is to provide a signaling system of this character in which the operation of the annunciator not only controls an indicating lamp circuit in the push button holder, but controls indicating lamp circuits to various other points which may indicate the fact that a signal has been given at a certain bed in a certain room.

Another object of the invention is to perfect details of construction of the mechanism involved in a signaling system of this character.

With the above and other objects in view, the invention consists in the signaling system, its parts and combinations of parts as herein claimed and all equivalents.

Referring to the accompanying drawings in which like characters of reference indicate the same parts in different views:

Figure 1 is a diagrammatic illustration of a signaling system embodying the present invention;

Fig. 2 is an enlarged view of the push button holder;

Fig. 3 is a central sectional view thereof;

Fig. 4 is an end view thereof with the cap removed and one of the lamps in place and sectioned;

Fig. 5 is a sectional view of the attachment plug for the wall socket;

Fig. 6 is an end view thereof;

Fig. 7 is a plan view of one of the annunciator units;

Fig. 8 is an end view thereof;

Fig. 11 is a vertical sectional view of one of the annunciator units;

Fig. 12 is a section taken on the line 12—12 of Fig. 11;

Fig. 13 is a section taken on the line 13—13 of Fig. 11;

Fig. 14 is a section taken on the line 14—14 of Fig. 11; and,

Fig. 15 is a bottom view, parts being broken away.

Figure 10:
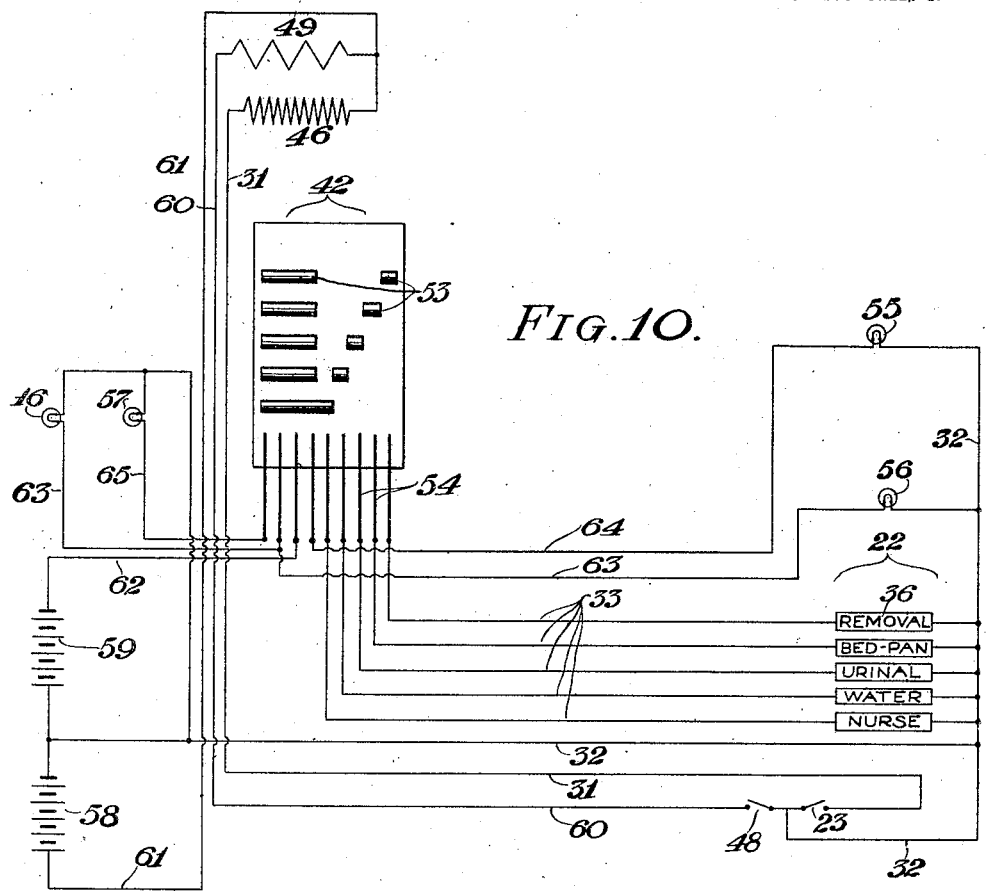
Fig. 10 is a diagram of circuit connections of one annunciator unit.

In these drawings 15 indicates annunciator units of which there is one for each room, or one for each bed when there is more than one bed in a room. These annunciators may be designated with the room numbers or the bed numbers, and are provided with signal lamps 16 and openings through which name faces 17 are shown whenever signals are given, such name faces exhibiting through the openings in the annunciator fronts the name of whatever is signaled for by the patient. Each annunciator unit is connected by a cable 18 with an outlet box 19 in the wall of the room indicated on the front of the annunciator or close to the bed so indicated, in the case of a ward containing a number of beds. An attachment plug 20 shown in detail in Figs. 5 and 6 is adapted to fit in a suitable socket provided for it in the outlet box 19 to establish connection between the various wires of the cable 18 and corresponding wires in a flexible cable extension 21, the arrangement of the projecting plug terminals 72 being such that the plug may only fit in the socket in the one position in which the proper connections are established. A push button holder 22, preferably in the form of a pear push button, as shown, is attached to the end of the cable extension 21 and, besides having the push button 23 at its end, has a series of openings 24 spaced around its intermediate portion and containing the names of the various needs of the patient.

The push button holder 22 preferably consists of a metal shell 25 and 26 formed of separable sections and containing a filler 27 of insulating material within a central bore of which the push button 23 is fitted. The joint between the cap member 26 of the shell and the other member 25 thereof may be located wherever desired, but it is here shown as a screw threaded joint separating the two members of the shell at the parting plane of the insulating filler 27 of shell member 25 and the insulating filler 28 of the cap member 26. These insulating fillers are preferably of a molded composition and are secured together by means of clamping screws 29 passing through and countersunk within the filler 28 and threading into insert bushings or studs 30 embedded in filler 27.

The end of the cable extension 21 passes through the rounding end of the cap 26 and the flaring bore of insulating filler 28 where the ends of the wires are separated and connected with various terminals, wires 31 and 32 connecting with the terminals of the push button 23, and wires 33 connecting with the screws 29, or more properly with lamp socket terminals 34 through which said screws pass.

Between the threaded bushings 30 there are regularly spaced cylindrical openings 35 forming lamp sockets in which are fitted small incandescent lamps 36, said lamp sockets communicating with the openings 24 previously mentioned to illuminate a translucent diaphragm 37 which may be positioned as a band surrounding the holder between the filler 27 and the shell 25 so as to serve for all of the openings, and having names printed thereon indicating the usual requirements of a hospital patient.

The end of the insulating filler 27 has a narrow annular groove 38 formed therein intercepting the outer edges of lamp sockets 35 and in this groove are inserted the arc-shaped flanges of the several terminal contacts 34 which are spaced from each other for insulation and each of which in extending across the edge of a lamp socket forms a contact for engagement with one of the terminal contacts of the lamp 36 inserted in said socket. The other terminal contact for each of the lamps is a common contact formed by a ring 39 set within a groove in the end of the insulating filler 27 and intercepting the inner edges of the lamp sockets so that the ring is engaged by the lamp terminal contacts when the lamps are in place. A screw 40 on a projection of the ring 39 forms a binding post for connecting therewith a branch wire 41 from wire 32.

Each of the indicating lamps 36 with its respective wire 33 forms a separate lighting circuit controlled by the contact shell 42 of the annunciator 15. This contact shell is carried by and insulated from a rotatably mounted drum 75 on which the name faces 17 are formed. The drum member is given a spring action to hold it in a normal position by means of a coil spring 43 in one end thereof. At the other end it has a ratchet engagement 76 with a pinion 77 which is held against it by a spring 44 and which is turned one step with each impulse produced by the push button 23. A solenoid 46 is energized by the circuit closed by the push button 23 to draw its armature 78 and the slide 79 attached to it and thereby produce the reciprocation of rack 45 which meshes with the pinion 77. The return of the armature slide is caused by a spring 80 confined within the latter and bearing against shoulders on the base 81. The connection between the slide 79 and the rack 45 is by means of an inclined slot and roller 82. A detaining spring 47 engages ratchet teeth 83 on the drum 75 to hold it in its various positions as it is moved step by step by the reciprocations of the rack 45 so that the words printed on the several name faces 17 of the drum may show through the openings in the annunciator front.

On the wall box 19 there is a push button 48 controlling a circuit through a resetting magnet 49 of the annunciator. The effect of this magnet is such as to move the armature 78 and rack 45 in a direction contrary to its feeding direction so as to bring a cam 50 of the pinion 77 into engagement with the rack and thus cause said pinion to be withdrawn from its ratchet engagement with the drum, meanwhile compressing the spring 44. A lug 51 on the pinion 77 in this releasing position of the pinion engages the detaining spring 47 and forces it out of engagement with the ratchet teeth of the drum so that with both ratchets disengaged the spring 43 returns the drum to its normal position in which it is stopped by a lug 52 thereon engaging a stationary part.

The details of construction of the means for turning and returning the drum of the annunciator form no part of the present invention and constitute the subject matter of a co-pending application.

Figure 9:
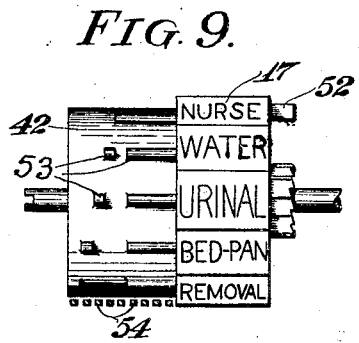
Fig. 9 is a detail view of the annunciator contact cylinder.

In the present instance, however, the drum is utilized as a lighting circuit controller for establishing different circuit connections in its various positions. Around a cylindrical portion of the drum are formed projecting ribs 53 for engagement with some of the spring contact fingers 54 arranged in a row on an insulating support. These contact fingers 54 connect with the wires 33 of the respective signal lamps 36 in the push button holder 22 to light such lamp as indicates the name appearing through the opening of the annunciator front at that time. Others of the contact fingers are connected to such other lighting circuits as are desired to communicate the signal to different parts of the building. As these auxiliary lighting circuits are desired to operate in each signaling position of the annunciator drum, the contacting ribs 53 are alike as to that portion thereof which is necessary for the operation of the auxiliary lighting circuits. The other portions of said ribs are in stepped relation as seen in Figs. 7 and 9, whereby the indicator lamps 36 are successively operated for the purpose above stated. These so-called auxiliary signal lights controlled by the portions of the contact ribs which are common to them all, may include the annunciator signal light 16, a room light 55 above the door of the patient's room, a wall box light 56 on the wall box 19 and one or more other lights 57 in the supply room or wherever it is desired to display the signal.

In the diagram Fig. 10 the various parts are numbered as above described and two batteries or other sources of electrical current supply 58 and 59 are shown, both connected with wire 32 as common return. One battery supplies current for the annunciator, solenoid 46 and resetting magnet 49, and the other battery supplies current for the various lighting circuits controlled by the drum 42 of the annunciator. The common return wire 32 for both battery circuits, besides having connection in common with all of the lamps 36 and lamps 56 and 55, connects through push button 23 with wire 31 leading to solenoid 46 and also connects through wall box push button 48 through wire 60 to resetting magnet 49, a wire 61 connecting both the solenoid 46 and resetting magnet 49 with one terminal of the battery 58, the other terminal of which is connected with wire 32. The battery 59 has one terminal connected with wire 32 and the other terminal connected with wire 62 leading to one of the contact fingers 54.

In the normal position of the annunciator drum 42 as shown, none of the contact fingers 54 are engaged by the contact ribs 53 and consequently none of the lights are burning. When, however, the patient desires attention he presses the push button 23 which closes the circuit through the solenoid 46 to move the annunciator drum its first step and bring the first contact rib 53 into engagement with the common contact fingers 54, and also the contact finger for the first indicating lamp 36, causing said lamp to burn, as well as the lamp 56 on the wall box 19, the lamp 55 at the door of the room, the lamp 16 on the annunicator for that room, and other lamps 57 in other parts of the building. The lighted indicator lamp 36 in the push button holder indicates to the patient the signal which he has caused to be displayed on the annunciator and if that is not the signal desired to be given he again presses the push button 23 and repeats the operation until the desired signal is indicated. Each pressure of the push button has served to cause the annunicator drum 42 to advance another step, changing the indicator lamp connections to correspond with the signal displayed through the openings in the annunciator front. When the desired signal is shown all conditions remain fixed until the nurse arrives at the patient's bedside and presses the resetting button 48. This closes the circuit through the resetting magnet 49 to return the annunciator drum 42 to its normal position and so restore original connections and extinguish all lamps.

The wall light 56 and the instrument light 16 which apply to the one transmitting device, may have their lead wires 63 connected to the same contact finger 54. The room light 55 which may serve in common for a number of transmitting instruments in the same room or ward requires a separate contact finger with which it is connected by wire 64. Likewise the supply room light and other lights 57 connected by wire 65 require separate contact fingers.

By means of this invention the patient is enabled to signal at once his desires without necessitating the delay incident to the nurse first making a trip to the bedside to ascertain what is wanted. Furthermore, the signal as given remains until the signaling system is reset by the nurse after responding to the signal. The patient knows just what signal has been given by the burning of the indicator lamp in the push button holder and it is not necessary for him to learn a code of signals.

The construction of the push button holder is such that it resembles the ordinary pear push and is light and convenient and may be moved from place to place by reason of its attachment plug connection with the outlet box.

The construction of the push button holder is also such that it is strong and durable and not liable to get out of order, and when one of the lamps burns out it may readily be replaced, it being only necessary to slip the lamp into the socket with one terminal engaging the contact ring 39 and the other terminal engaging the contact 34 to establish electrical connections therefor. The screws 29 which serve to hold the two insulating fillers together also constitute binding posts for connecting the ends of the wires 33 with the contact 34. The entire construction is simple and free from complication.

I desire it to be understood that this invention is not limited to any specific form or arrangement of parts except in so far as such limitations are specified in the claims.

What I claim as new and desire to secure by Letters Patent is:

1. An electrical signaling system comprising an electrical circuit including an annunciator operating step by step by successive electrical impulses, a push button located at a distance for transmitting such electrical impulses to the annunciator to produce any one of a number of signals, a plurality of electrical circuits each including a visible indicator in the holder for the push button, and means operated by the annunciator for separately closing the circuits containing the visible indicators.

2. An electrical signaling system comprising an annunciator adapted to show different signals, a push button connected with the annunciator for producing the successive operations thereof, a holder for said push button, indicators contained in said push button holder and controlled by the annunciator in its various positions whereby the person sending the signal will have indicated to him the signal produced by the annunciator.

3. In an electrical signaling system, an annunciator having various positions to which it is moved by successive electrical impulses, a push button connected with the annunciator for causing said electrical impulses, a switch having a series of contact fingers brought successively into closed position by the annunciator in its successive positions, and indicating lamps at the place of the push button controlled by the several contact fingers.

4. In an electrical signaling system, an annunciator having a rotatable drum moved step by step by successive electrical impulses and having names thereon to be successively presented to view in its several positions, a push button for causing the said electrical impulses, a switch having a number of contact fingers, indicating lamps at the place of the push button controlled by the several contact fingers, and projections on the annunciator drum engaging the contact fingers for causing the indicator lamps to indicate the positions of the annunciator drum.

5. An electrical signaling system, comprising an annunciator adapted to show different signals, a push button connected with the annunciator for producing the successive operations thereof, a holder for said push button, indicating lamps contained in said push button holder and controlled by the annunciator in its various positions whereby the person sending the signal will have indicated to him the signal produced by the annunciator.

6. In a signaling system, a signal transmitting means for controlling a step by step annunciator and indicating the position of the annunciator, comprising a push button for connection with the annunciator, a holder for the push button, and suitably designated indicating lamps in the push button holder adapted to be controlled by the annunciator in the different positions thereof to indicate the signal produced by the annunciator.

7. A signal transmitting means for signaling systems, comprising a flexible cable, a push button holder mounted thereon and constituting a terminal head therefor, a push button at the end of said holder, openings in the holder, indicating lamps contained within said openings, and means for separately lighting the lamps on the operation of the push button.

8. A signal transmitting means for electrical signaling systems, comprising a flexible cable, a push button holder mounted thereon and forming the terminal head therefor, a push button carried at the end of the holder, there being longitudinally extending openings around the sides of the holder, indicating lamps contained in said openings, a band of translucent material surrounding the holder and having names marked thereon for illumination by the indicating lamps, and means for separately lighting the lamps on the operation of the push button.

9. A signal transmitting means for electrical signaling systems, comprising a sectional metal shell, an insulating filler therefor, a push button set within the shell and its filler, there being openings within the filler and through the shell, indicating lamps within the openings of the filler, a strip of translucent material secured between the filler and the shell and extending across the openings of the shell and having names marked thereon for illumination by the indicating lamps, and means controlled by the push button for making electrical connections with the indicating lamps.

10. A signal transmitting means for electrical signaling systems, comprising a metal shell formed of detachable sections, an insulating filler for the shell, a push button set within the shell and its filler, there being openings through the shell and its filler arranged in circular formation, said openings in the filler forming lamp sockets, indicating lamps fitting in the lamp sockets, a contact ring let into the filler and exposed at one side of each lamp socket to be engaged by one terminal contact of the lamp within said socket, contacts let into a circular groove in the filler and each exposed within one of the lamp sockets to engage with the other terminal contact of the lamp within said socket, and a cable passing through the end of the shell and having its wires connected with the push button, the ring and the contacts respectively, said push button controlling the passage of current through the cable to said ring and contacts.

11. A signaling system for hospitals and the like, comprising an annunciator having different positions to which it may be moved by successive electrical impulses, a push button for causing said electrical impulses, a switch mechanism operated by the annunciator for lighting indicating lamps within the push button to indicate to the sender of the signal that signal which is displayed by the annunciator and for lighting a signal lamp at the door of the room containing the push button and for lighting a signal lamp at the annunciator in each signaling position thereof.

12. An electrical signaling system, comprising an annunciator having different signaling positions to which it is moved by successive electrical impulses, a cable leading therefrom, a wall box forming an outlet connection for the cable, an attachment plug fitting in the wall box, a flexible cable extension on the attachment plug, a push button holder on the flexible cable extension forming a terminal head therefor, a push button on the push button holder for causing the electrical impulses for operating the annunciator, indicating lamps in the push button holder, switch mechanism operated by the annunciator for controlling circuits through the several indicating lamps to indicate the signal shown by the annunciator, a light on the wall box also controlled by the switch mechanism, means for resetting the annunciator, and a push button on the wall box for controlling said resetting means.

In testimony whereof, I affix my signature, in presence of two witnesses.

BORNETT L. BOBROFF.

Witnesses:
R. S. C. CALDWELL,
H. D. CHASE.